US005598557A

United States Patent [19]

Doner et al.

[11] Patent Number: 5,598,557
[45] Date of Patent: Jan. 28, 1997

[54] APPARATUS AND METHOD FOR RETRIEVING AND GROUPING IMAGES REPRESENTING TEXT FILES BASED ON THE RELEVANCE OF KEY WORDS EXTRACTED FROM A SELECTED FILE TO THE TEXT FILES

[75] Inventors: Christopher G. Doner, San Francisco; Lawrence G. Miller, Saratoga; Ian D. Emmons, Richmond; Michael R. Barnes, Berkeley, all of Calif.

[73] Assignee: Caere Corporation, Los Gatos, Calif.

[21] Appl. No.: 948,669

[22] Filed: Sep. 22, 1992

[51] Int. Cl.$^6$ .............................. G06F 17/30; G06F 17/21
[52] U.S. Cl. ................... 395/605; 364/419.19; 395/348; 395/759
[58] Field of Search ................................ 395/600, 159; 364/419.08, 419.19

[56] References Cited

U.S. PATENT DOCUMENTS

| | | | |
|---|---|---|---|
| 4,359,824 | 11/1982 | Glickman et al. | 364/419.19 |
| 4,839,853 | 6/1989 | Deerwester et al. | 395/600 |
| 4,868,733 | 9/1989 | Fujisawa et al. | 395/600 |
| 5,020,019 | 5/1991 | Ogawa | 395/600 |
| 5,060,135 | 10/1991 | Levine et al. | 364/200 |
| 5,062,074 | 9/1991 | Kleinberger | 395/600 |
| 5,211,563 | 5/1993 | Haga et al. | 434/322 |
| 5,263,159 | 11/1993 | Mitsui | 395/600 |
| 5,276,616 | 1/1994 | Kuga et al. | 364/419.8 |
| 5,297,042 | 3/1994 | Morita | 364/419.19 |

OTHER PUBLICATIONS

Salton et al., "Parallel Text Search Methods", *Communications of the ACM* vol. v31 Issue N2 p. 202(14), Feb. 1988.

Kimoto et al "A Dynamic Thesaurus and Its Application to Associated Information Retrieval" Jul. 1991 IJCNN-91-Seattle IEEE Press pp. 19-29 vol. 1.

Churbuck, "Haystack Searching", Forbes, v. 149, n. 4 Feb. 17, 1992, pp. 130 (2).

Donna Harman and Gerald Candela, "Retrieving Records from a Gigabyte of Text on a Minicomputer Using Statistical Ranking", Dec. 1990, pp. 581–589.

Kimoto et al., "Automatic Indexing System for Japanese Text" 1989, Review of the Electrical Communications Laboratories, V. 37, No. 1, pp. 51–56.

Al-Hawamdeh, S. et al., "Compound Document Processing System", Proc. of the Fifteenth Annual International Computer Software and Applications Conf., pp. 640–644 Sep. 1991.

Salton, G. et al., "The SMART Automatic Document Retrieval System—An Example", Communications of the AMC, vol. 8 No. 6, pp. 391–398 Jun. 1965.

*Primary Examiner*—Thomas G. Black
*Assistant Examiner*—Jack M. Choules
*Attorney, Agent, or Firm*—Blakely, Sokoloff, Taylor & Zafman

[57] ABSTRACT

An apparatus for searching and retrieving files in a database without a user being required to provide keywords or query terms. A user first selects and opens a reference file. A natural language recognition algorithm is used to determine the subject words of the selected file. Next, a statistical comparison between the subject words and the contents of files in a database is performed. Based on the statistical comparison, files are assigned weighted relevancies. Relevant files are prioritized and displayed to the user in groups. The groups are formed based on the retrieved files relevance to specific subject works of the selected file. The groups of retrieved files are displayed in associating with the subject word they are relevant to.

30 Claims, 8 Drawing Sheets

FIG_3

FIG_4

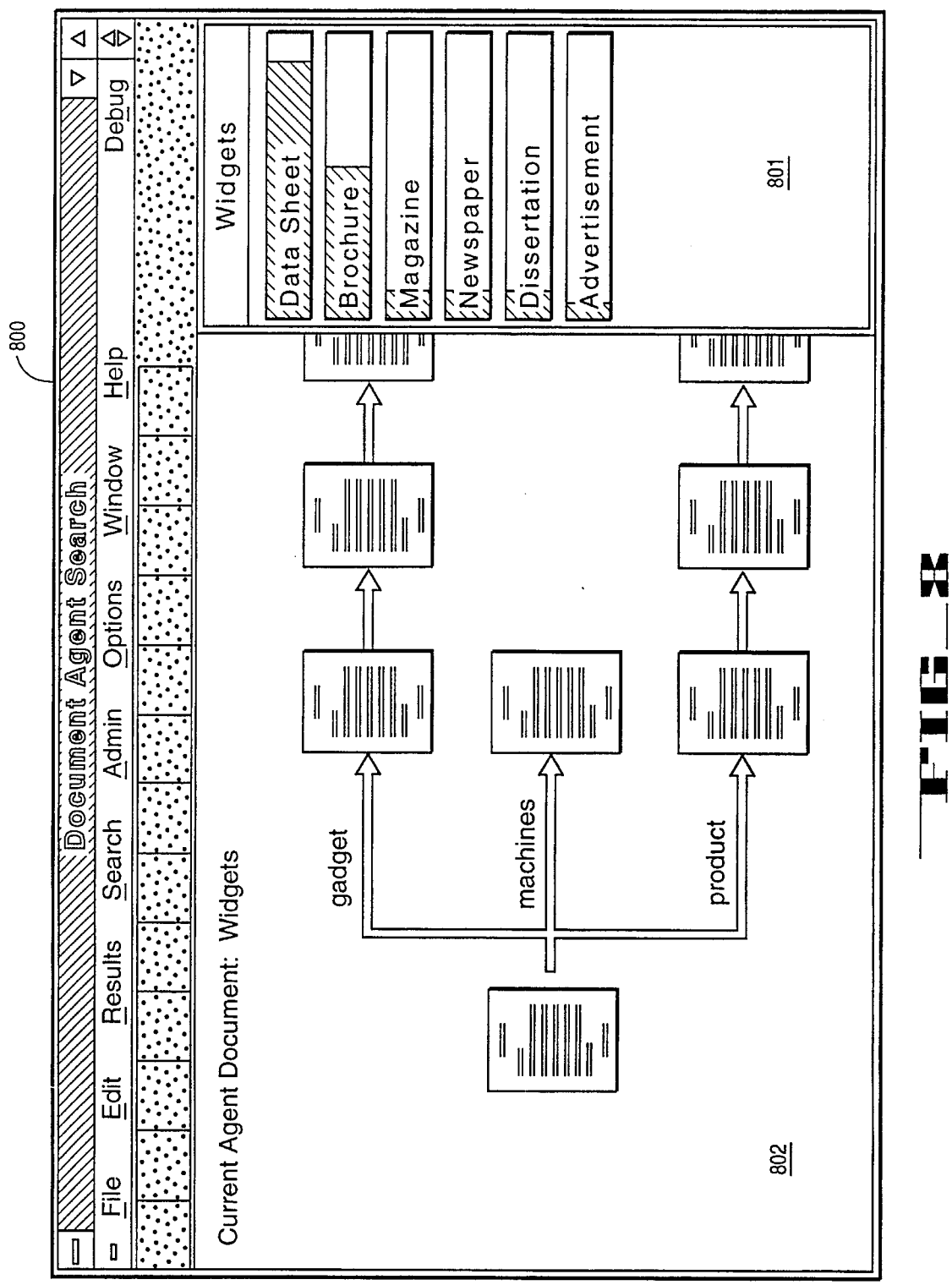
FIG_X

APPARATUS AND METHOD FOR RETRIEVING AND GROUPING IMAGES REPRESENTING TEXT FILES BASED ON THE RELEVANCE OF KEY WORDS EXTRACTED FROM A SELECTED FILE TO THE TEXT FILES

FIELD OF THE INVENTION

The present invention pertains to the field of computerized information search and retrieval systems and methods. More particularly, the present invention relates to an apparatus and method for searching and retrieving text found in a database as a function of their relevancy to a desired subject matter.

BACKGROUND OF THE INVENTION

Due to rapid advances made in electronic storage technology, it is becoming ever more convenient and economically attractive to store information electronically as a series of digital bits of data. As such, "texts" from magazines, newspapers, journals, encyclopedias, books, and other printed materials are increasingly being classified and grouped together into various databases. These texts can be comprised of miscellaneous strings of characters, sentences, or documents having indeterminate or varied lengths and can be of a wide variety of data classes, such as words, numbers, graphics, etc. Computers are then utilized to access these databases in order to store additional new text and to retrieve old, stored texts. One added advantage of electronically storing information is that computers can be programmed to search and retrieve specific texts in a database which is of special interest to the user. In essence, a computer can perform indexing functions, such as a card catalog. A user can retrieve a particular text by inputting the title, author, date of publication, or some other description specific to that text. In response, the computer can automatically search, retrieve, and display the desired text.

However, if the user does not know of a specific text or wishes to conduct research on a general subject matter, the computer can be programmed to select certain text which might be of significance to the user. Prior art search and retrieval systems have typically accomplished this by focusing on "keywords" or query terms. A user who wishes to find texts of a particular nature, first specifies one or more keywords which might be contained in the desired texts. Typically, each text in the database is assigned a unique reference number. All words in the text, except for trivial words such as "a," and "the," etc., are tagged with the unique reference number and are placed in an alphabetical index. Hence, all texts in the database containing a given keyword are located by searching for that keyword in the alphabetical index and returning a set of reference numbers. Thereby, texts corresponding to the reference numbers are known to contain the keyword and are accessed via the computer.

In order to provide the user with greater flexibility, many prior art search and retrieval systems provide for "Boolean" searches. A Boolean search involves searching for documents containing more than one keyword. This is typically accomplished by joining the keywords with conjunctions such as the exclusive "AND" function and/or the inclusive "OR" function. If two or more keywords are joined by an AND, only those texts which contain all those joined keywords are retrieved. If two or more keywords are joined by the inclusive "OR" function, all texts which contain at least one of the joined keywords are retrieved. For example, given that a user specifies a search for (keyword 1 AND keyword 2) OR keyword 3, the computer retrieves all texts containing keyword 3 plus those texts containing both keyword 1 and keyword 2. Two examples of this type of text retrieval system are the LEXIS™ and Dialog™ systems.

Even though computerized search and retrieval systems greatly facilitate a user in locating relevant texts, there yet remains many disadvantages with these systems. One disadvantage of this type of prior art search and retrieval method is that the user is required to anticipate one or more keywords used to identify and distinguish relevant texts. In other words, the user must guess the words used by the author of a desired text. This problem arises because a user typically does not have advance knowledge of how the texts of interest are worded. If a user fails to guess appropriate keywords, highly relevant text might be missed.

Another disadvantage with typical prior art search and retrieval systems is that picking significant keywords is a tricky and delicate operation. If a keyword is too common and/or if a user utilizes an inclusive OR function to join multiple keywords, a search request can potentially result in the retrieval of hundreds of text satisfying the broadly defined search criteria. Often, only a small handful of text among the hundreds of retrieved texts is of actual interest to a user. The user must then expend much time and energy to tediously scan each text and winnow out the truly relevant texts from the vast pool of retrieved texts. Conversely, if the keyword is too specific or if the exclusive AND function is used to join multiple keywords, the search might be too restrictive. Highly relevant text which did not meet the specific keyword criteria will not be retrieved. Hence, a user frequently chooses different keywords and conjunctions in a costly and time-consuming iterative process to tailor the search request. Consequently, operating typical prior art search and retrieval systems require skill, training, and expertise.

Therefore, what is needed is an apparatus and method for determining and ranking the significance of each retrieved document so that a user can broaden the scope of a search to catch any relevant text without being unduly burdened by having to wade through inconsequential texts. It would be highly preferable for the same apparatus and method to also provide a mechanism to easily and naturally navigate between texts dealing with related subject matter.

SUMMARY OF THE INVENTION

In view of the problems associated with information search and retrieval systems, one object of the present invention is to provide an apparatus and method for ranking retrieved documents according to its relevance.

Another object of the present invention is to provide an information search and retrieval system which does not require a user to specify keywords or query terms.

Another object of the present invention is to provide a mechanism so that a user can easily and naturally navigate between groups of files dealing with related subject matter.

These and other objects of the present invention are implemented in an information search and retrieval computer system. A user initiates a search by selecting and opening a file containing subject matter of particular interest. The computer system performs a natural recognition algorithm to determine the subject words of the document corresponding to the selected file. This is accomplished by parsing the document into sentences, determining the parts of speech for each word in the sentence, and picking out the subject word of the sentence based on heuristic syntactical grammar rules.

Once all the subject words in the reference document have been found, they are used in a statistical comparison algorithm to determine the relevancy of each file in a database. A file's relevancy is a function of both the frequency of subject words occurring in that file and the distribution of the subject words within the database. The file's relevancy is also normalized to its length. Relevant files are then retrieved and displayed in a list. The most relevant documents are displayed at the top of the list, while those which are not as relevant are displayed in descending order. Hence, a user is not required to guess at keywords or query terms prior to conducting a search. The user need only select a document which is of interest, and the present invention retrieves and prioritizes relevant documents residing in the database.

The present invention also provides a user with a means for navigating between files of related topics. A thumbnail image comprising a scaled down bit-mapped representation of the cover sheet of the reference document is displayed. The three most commonly occurring subject words in the reference document are displayed next to this thumbnail image. Files in the database which have relevance to each of the three subject words are retrieved and are prioritized according to their degree of relevance to that particular subject word. The thumbnail image of the most relevant file to the first subject word is displayed adjacent to that subject word. It is followed by the thumbnail image of the next most relevant file to the first subject word, etc. Similar thumbnail images of files corresponding to the second and third subject words are also displayed.

By placing a moveable cursor over any of the thumbnail images and clicking on it, the user can designate that file to be the new reference file. This initiates a new search based on the subject words of the new reference file. The search produces a new list of files ranked according to the degree of relevance to the new reference file. It also produces the three most common subject words of the new reference document and new thumbnail images of files prioritized to those subject words. Thus, the present invention allows a user to conduct research on a topic by successfully selecting new reference documents based on prior search results.

BRIEF DESCRIPTION OF THE DRAWINGS

The present invention is illustrated by way of example, and not by way of limitation, in the Figures of the accompanying drawings and in which like reference numerals refer to similar elements and in which:

FIG. 8 illustrates a search results window.

DETAILED DESCRIPTION

An apparatus and method for searching and retrieving significant text from a database is described. In the following description, for the purposes of explanation, numerous specific details such as mathematical formulas, flowcharts, menus, etc., are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
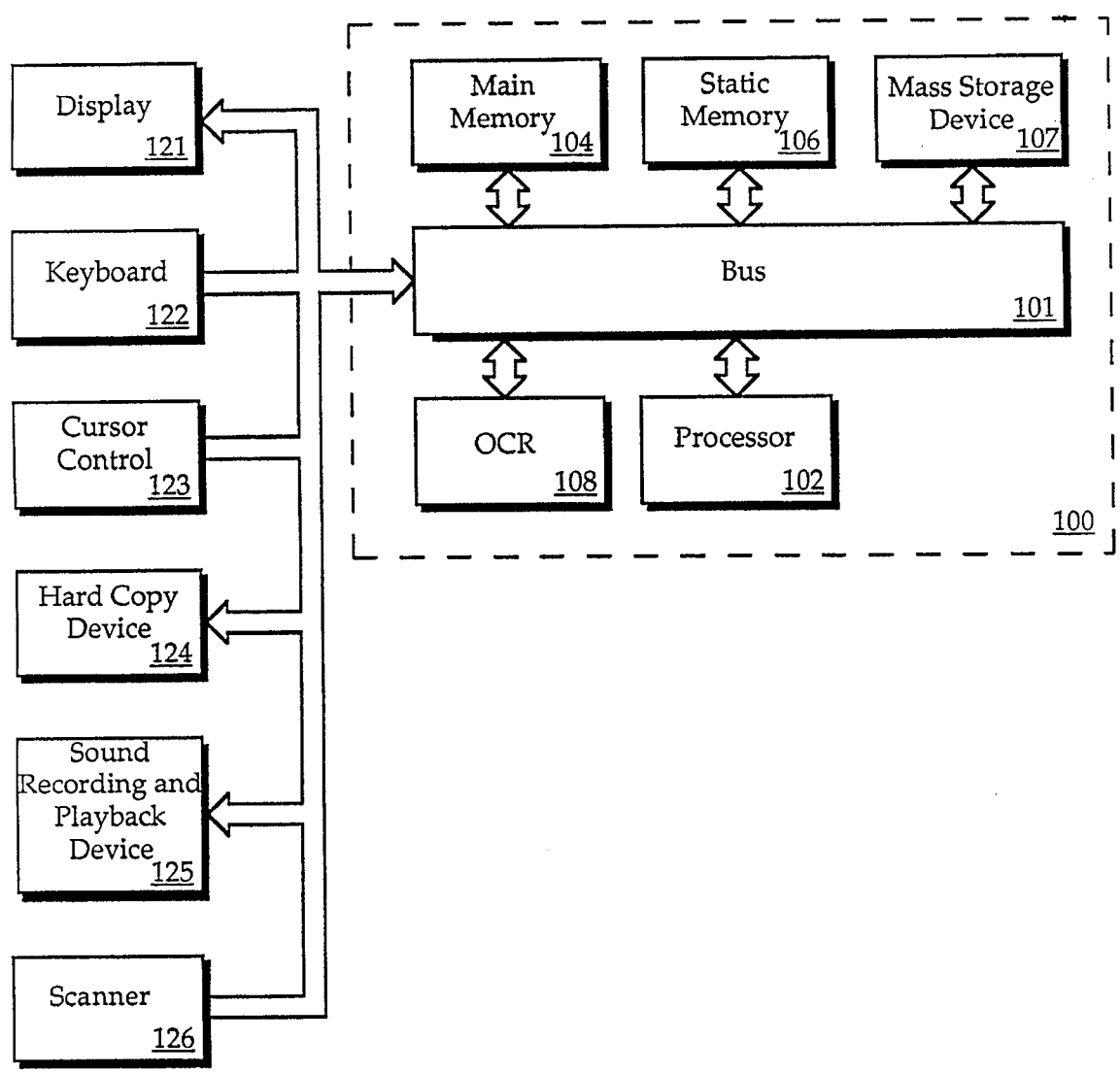
FIG. 1 illustrates a computer system as may be utilized by the preferred embodiment of the present invention.

Referring to FIG. 1, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

Furthermore, a data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Moreover, data can be input by scanner 126. The scanner 126 serves to read out the contents of an original document or photograph as digitized image information. An OCR (Optical Character Reader) 108 can be utilized to recognize textual portions of a scanned document. Another device which may be coupled to bus 101 is hard copy device 124 which may be used for printing instructions, data, or other information on a medium such as paper, film, or similar types of media. Additionally, computer system 100 can be coupled to a device for sound recording and/or playback 125 such as an audio digitizer coupled to a microphone for recording information. Further, the device may include a speaker which is coupled to a digital to analog (D/A) converter for playing back the digitized sounds. Finally, computer system 100 can be a terminal in a computer network (i.e., a LAN).

Figure 2:
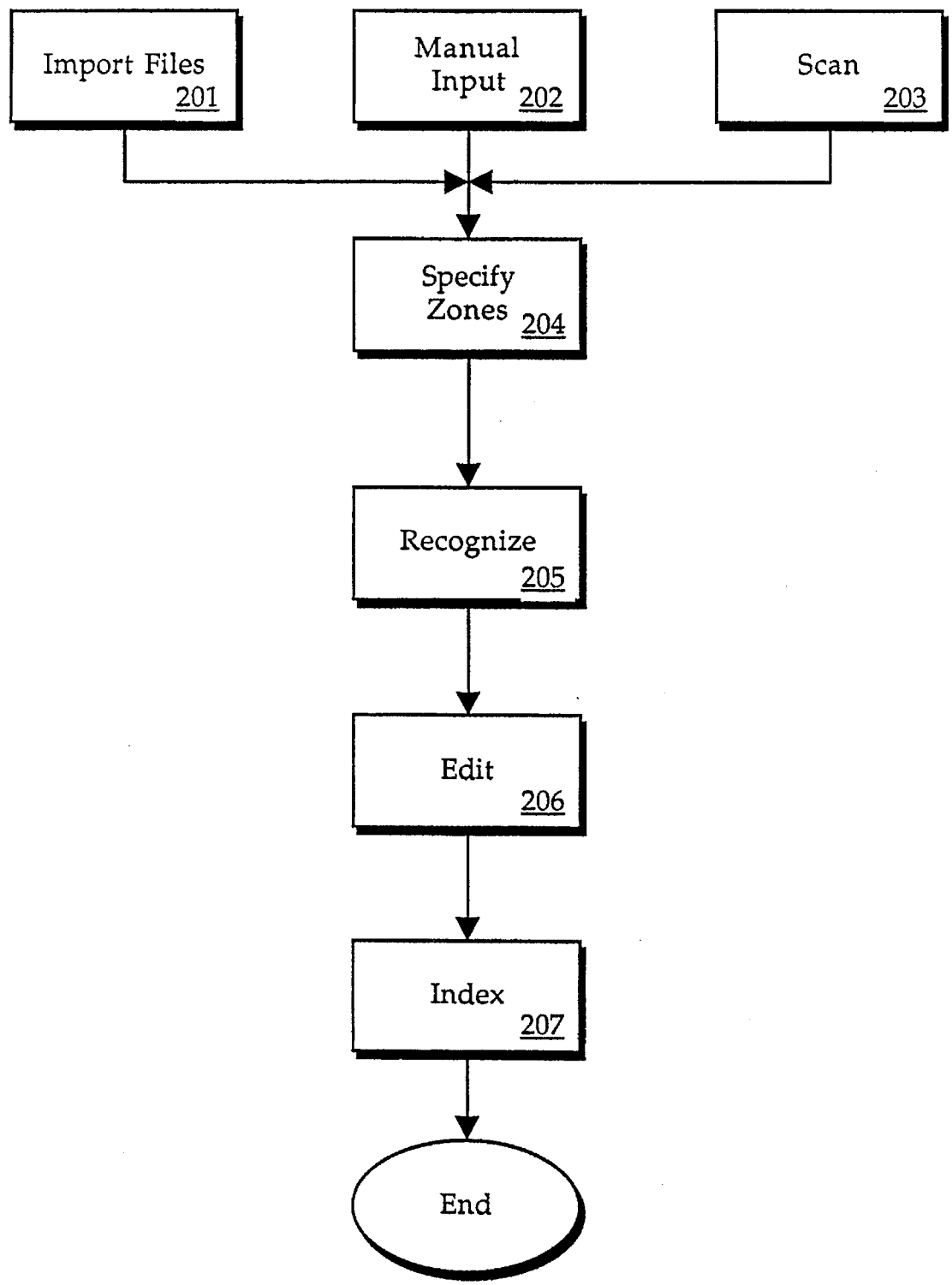
FIG. 2 is a flowchart illustrating the steps for creating a new database.

The currently preferred embodiment of the present invention can be part of an overall document management software package. To conduct a search, a user first specifies a particular database. Databases are usually organized so that files stored on a particular database share a common attribute. For example, an attorney might utilize a database containing cases from a particular jurisdiction; a doctor might consult a database containing files of patient histories; a marketing manager might access a database containing product reviews for spotting market trends; etc. The database can be an already existing database or a newly created database. FIG. 2 is a flowchart illustrating the steps for creating a new database. Computer files containing useful information can be imported by copying it over to the database, step 201. Moreover, data in the form of documents, reports, magazine and newspaper articles, can be entered either manually by means of a keyboard, step 202, or they can be entered by using an optical scanner, step 203. Moreover, the data can already exist on the computer system. The user can specify zones of a scanned image or file which is of particular significance for further processing, step 204. Textual portions of a scanned bit-map image or file can be recognized and converted into ASCII code data, step 205. The ASCII code data can then be edited, step 206. Finally, the processed information is indexed and saved to the database, step 207.

Figure 3:
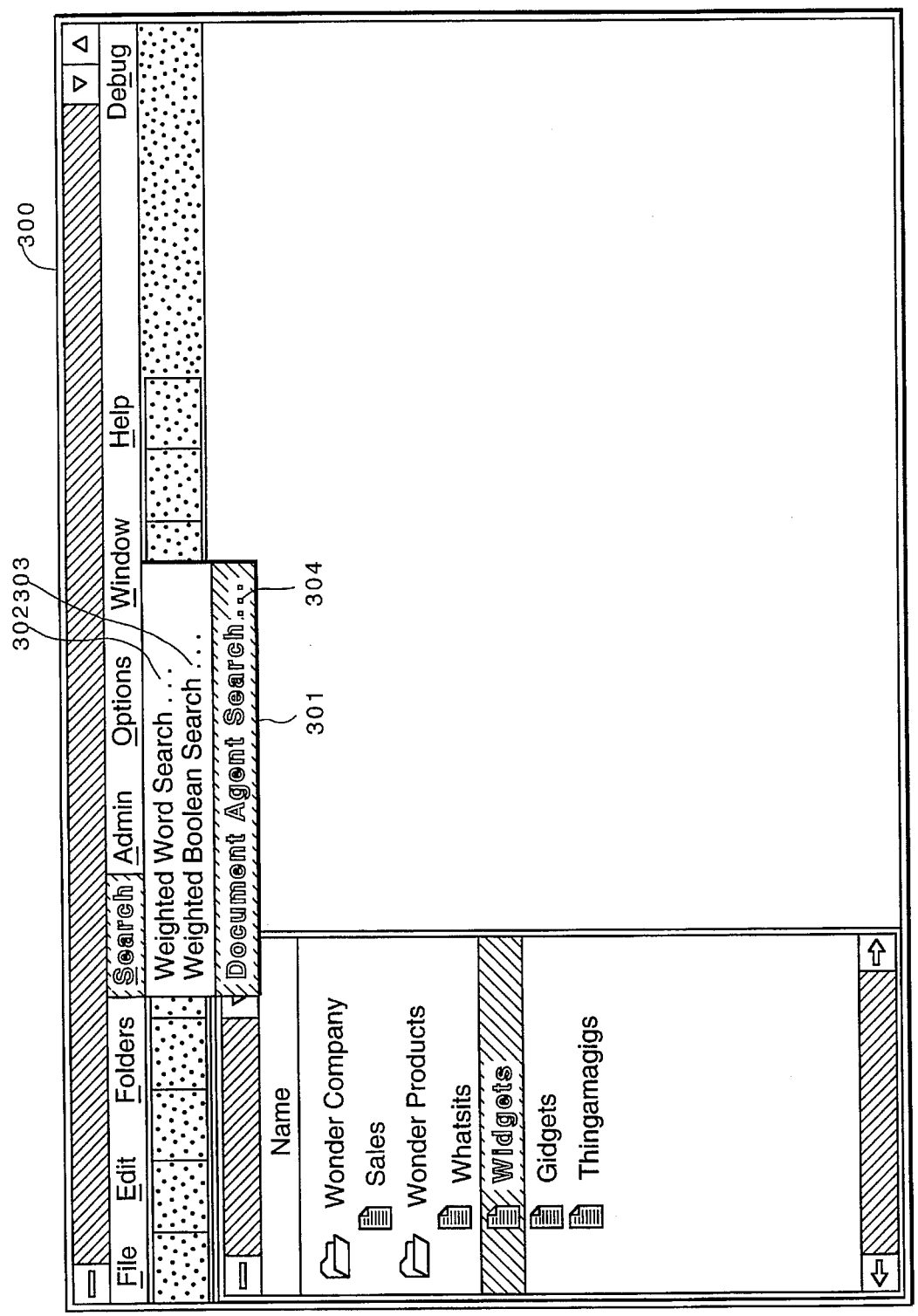
FIG. 3 illustrates a typical window displayed on a CRT which can be used as a user interface for the present invention.

Once a database has been selected, the user can select a weighted keyword search, a weighted Boolean search, or a document agent search. FIG. 3 illustrates a typical window 300 which can be displayed on a CRT. Window 300 is provided as user interface for the present invention. Window 300 is comprised of a number of pull-down menus which can be accessed by a cursor positioning device, such as a mouse. The search menu 301 is accessed by the user to select the desired type of search (i.e., keyword 302, Boolean 303, or document search 304). The selected type of search is highlighted. For example, FIG. 3 illustrates the user having selected a Document Agent Search 304.

Figure 4:
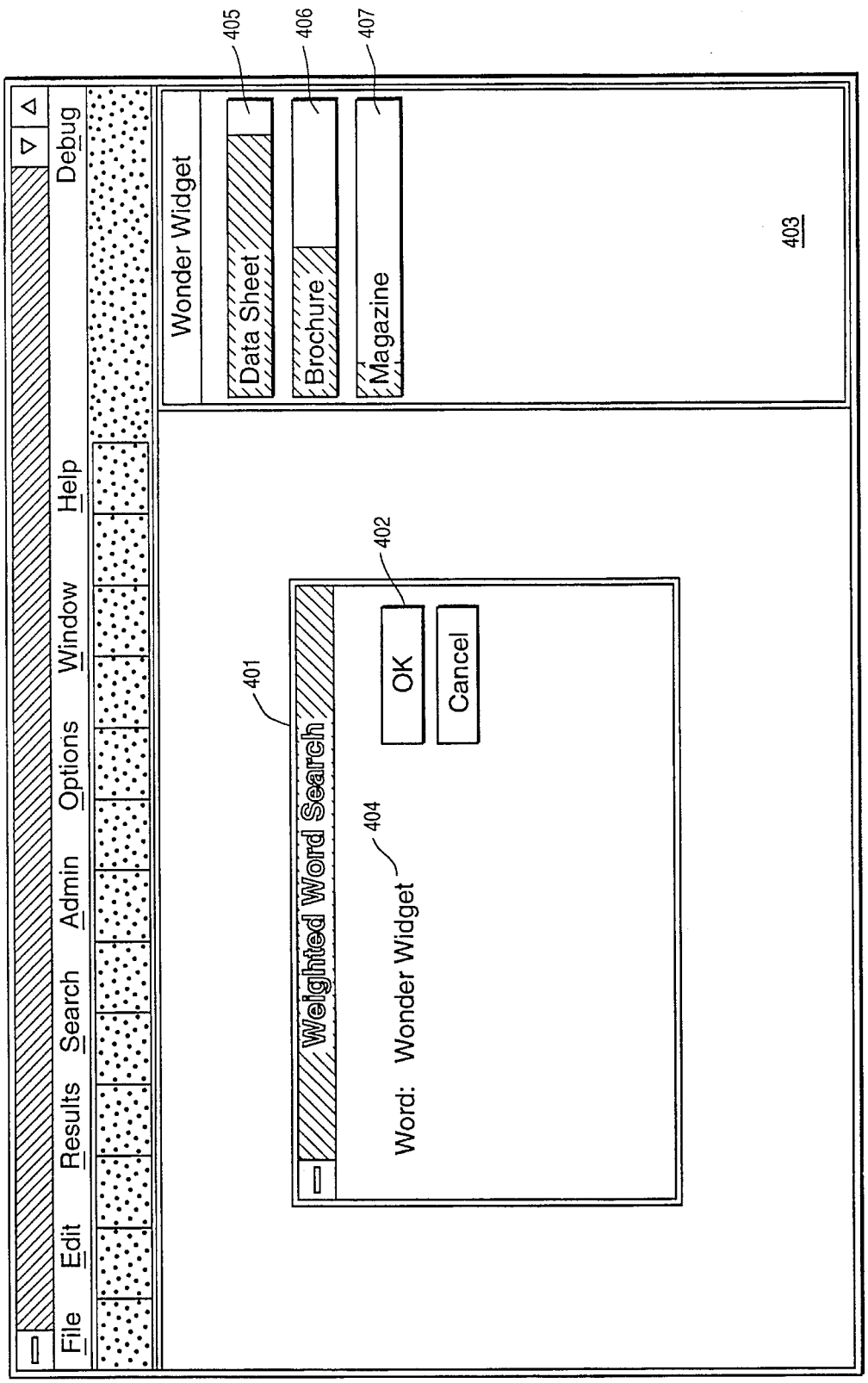
FIG. 4 illustrates a window displaying a search dialog box.

If the user selects the weighted word search 302, a search dialog box 401 is displayed, as illustrated in FIG. 4. The user then types in one or more keywords and clicks on the OK box 402 to initiate the search based on the inputted keyword(s). When the search is completed, a Search Results window 403 is displayed. FIG. 4 illustrates a Search Result window 403 displaying a list of retrieved documents 405–407. The list displays those retrieved documents as a function of their relevance. Documents having the most significance are displayed at the top of the list, whereas retrieved documents having less relevance are displayed near the bottom of the list. In addition to displaying each retrieved document according to its relevancy, a box bearing a bar is superimposed over each document's file name. The extension of the bar indicates that document's degree of relevance to the keyword(s). For example, a search based on the keyword WonderWidget 404 might result in the retrieval of three documents 405–407. (It is noted that WonderWidget and Widgets are fictitious names.) A data sheet 405 describing the product, which is highly relevant, is displayed at the top of the list and has a relatively long bar. A brochure 406 describing all Wonder products, including WonderWidget, having some relevance, is displayed in the middle. It has a medium-sized bar. A magazine article 407 of a competing product that mentions WonderWidget, has low relevance and is ranked last in the list. Correspondingly, it has a small bar. In the currently preferred embodiment, the bars are color coded red, green, and blue, to respectively indicate the documents having much, some, and less relevance. The determination of the document's relevancy is described in detail below.

For greater flexibility, a user can specify a Weighted Boolean Search, wherein keywords are joined by conjunctions (e.g., AND, OR, etc.) Again, any retrieved documents are weighted and ranked according to their relevance to the Boolean search request. Typically, a Boolean search results in the retrieval of a few highly relevant documents, a medium sized grouping of documents having modest relevancy, and a large grouping of documents having little relevancy. Note that in the present invention, a user is not unduly penalized for using inclusive OR conjunctions. Although more documents are likely to be retrieved, the user can quickly scan through the most significant documents (i.e., documents at the top of the list). The effect of adding keywords in an inclusive OR search contributes to the determination of a document's relevancy and influences which documents "float" to the top of the list.

Alternatively, a user can opt for a Document Agent Search, which allows the user to initiate a search for documents which are similar to a reference document selected by the user. First, the user selects and opens a reference document. Next, the user selects the Document Agent Search option from the Search pull-down menu. Thereupon, the present invention retrieves documents from the database which are related to the reference document. The relevancy of each retrieved document to the reference document is determined, and each document is ranked and displayed according to its relevancy.

Figure 5:
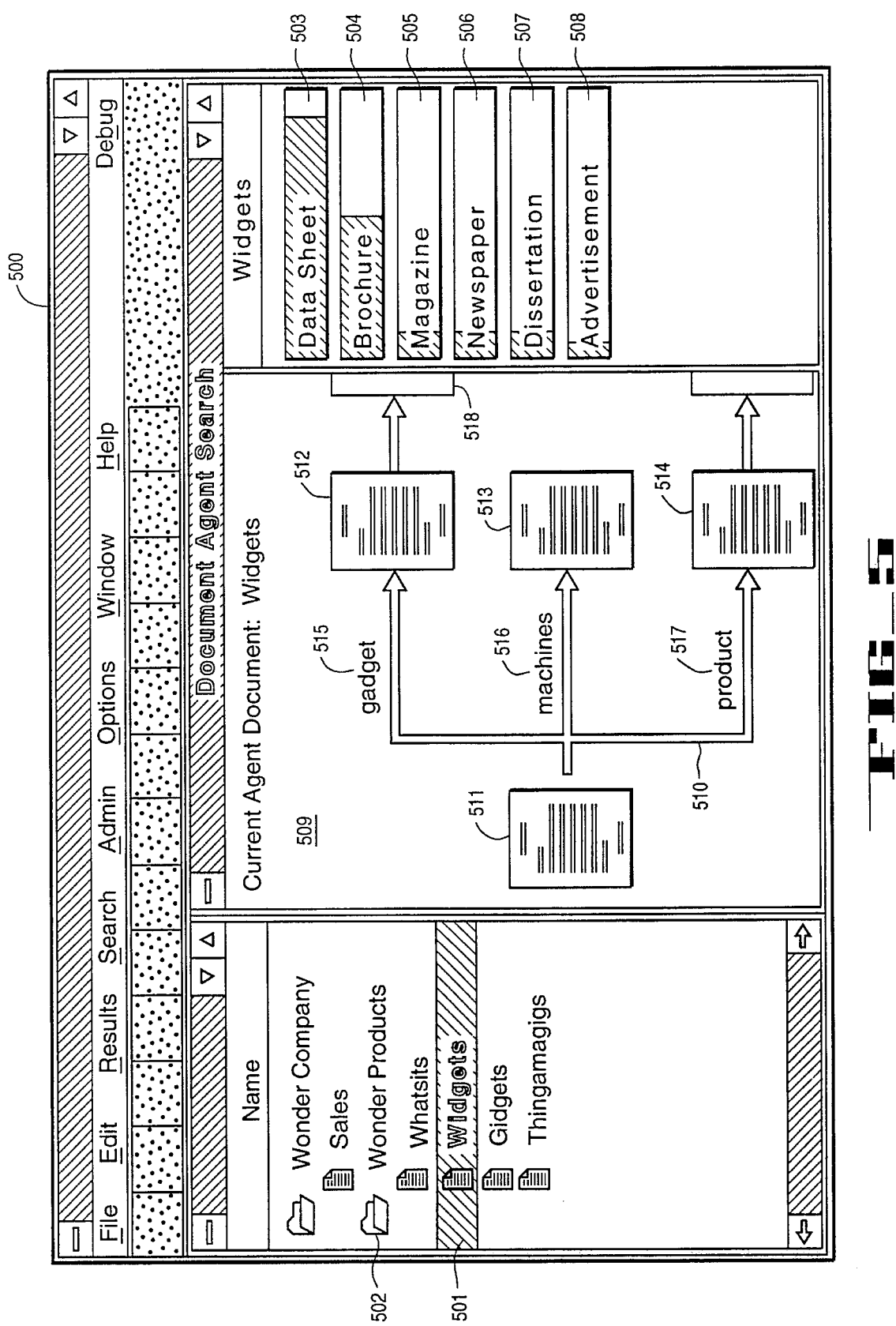
FIG. 5 is a window illustrating the results of a document agent search.

FIG. 5 shows a window 500, as may be displayed on a CRT, illustrating the results of a Document Agent Search. A user first selects a particular file, such as Widgets 501, from a folder Wonder Products 502. The Widgets 501 document is designated the reference document against which other documents in the database are compared in determining relevancy. Note that with this type of search, the user is not required to supply keywords. The present invention retrieves those documents that are considered to be relevant, ranks each retrieved document, and lists the retrieved documents in ascending order based on their degrees of relevancy. For example, if six documents 503–508 were retrieved, the top document entitled Data Sheet 503 is considered to have the most relevance to the reference document Widgets 501. Likewise, the bottom documents, such as Dissertation 507 and Advertisement 508, are considered to be the least relevant.

A section 509 of window 500 is used to display an organized chart 510 of relevant documents. Initially, chart 510 displays a "thumbnail" image 511 of the cover sheet of the reference document. A thumbnail image is a bit-mapped shrunken, miniaturized representation of a page of a document (usually the title page ). Multiple rows of thumbnail images 512–514 are displayed to the right of the thumbnail image of the reference document. Each row comprises retrieved files of relevant documents. The first row corresponds to retrieved files having relevance with respect to the most relevant subject word in the reference document; similarly, the second row corresponds to retrieved files having relevance with respect to the second most relevant word in the reference document; etc. For example, if the three most relevant subject words in the reference document Widgets 511 are "gadget" 515, "machines" 516, and "product" 517, those documents having relevance to the word "gadget" is categorized into the top row. The second and third rows comprise documents having relevance to the subject words "machines" and "product." The documents in a row are arranged so that the most relevant document is placed at the left with successively decreasing relevant documents placed to the right. Hence, document 512 has more relevance to the subject word "gadget" 515 than document 518.

Chart 510 provides a user with a means for navigating between related documents. By glancing at the thumbnail images, the subject words, and the titles, a user can get a general indication of those documents which are of interest. The user can also open a document to examine its contents. The user can then select a particularly interesting document by positioning a cursor over that document's thumbnail image and clicking a button. This designates that document as the new reference document. This results in a new search, yielding more related documents. The user can repeatedly designate new reference documents, conduct searches based on the new reference, and select different documents found in prior searches as the reference document on which further searches are conducted. Thus, the present invention allows a user to research a topic by "navigating" through related topical paths in a focused fashion.

The determination of a document's relevance is now described in detail. For weighted keyword and Boolean searches, a statistical measure of similarity is determined. This is accomplished by determining and assigning a ranking weight for each document. The ranking weight is based on a formula involving a function of the frequency of keywords in that document and a function of the distribution of the keywords within the database. The frequency of keywords in a document is typically a good indication of the extent to which that document is relevant to those terms. The distribution of a keyword within a database is useful in weighting the relative importance of the keywords. For example, the keyword "computer" in a computer science database has relatively little significance because it is not that unique, relative to that database. In contrast, "computer" as a keyword has more significance in an agricultural database. One measure of this relative significance is provided by the inverse document frequency weight (IDF). The document's keyword frequency weight and its IDF weight are combined and normalized by a function of the length of the record. This results in a total document relevance weight which is used in ranking the documents.

Figure 6:
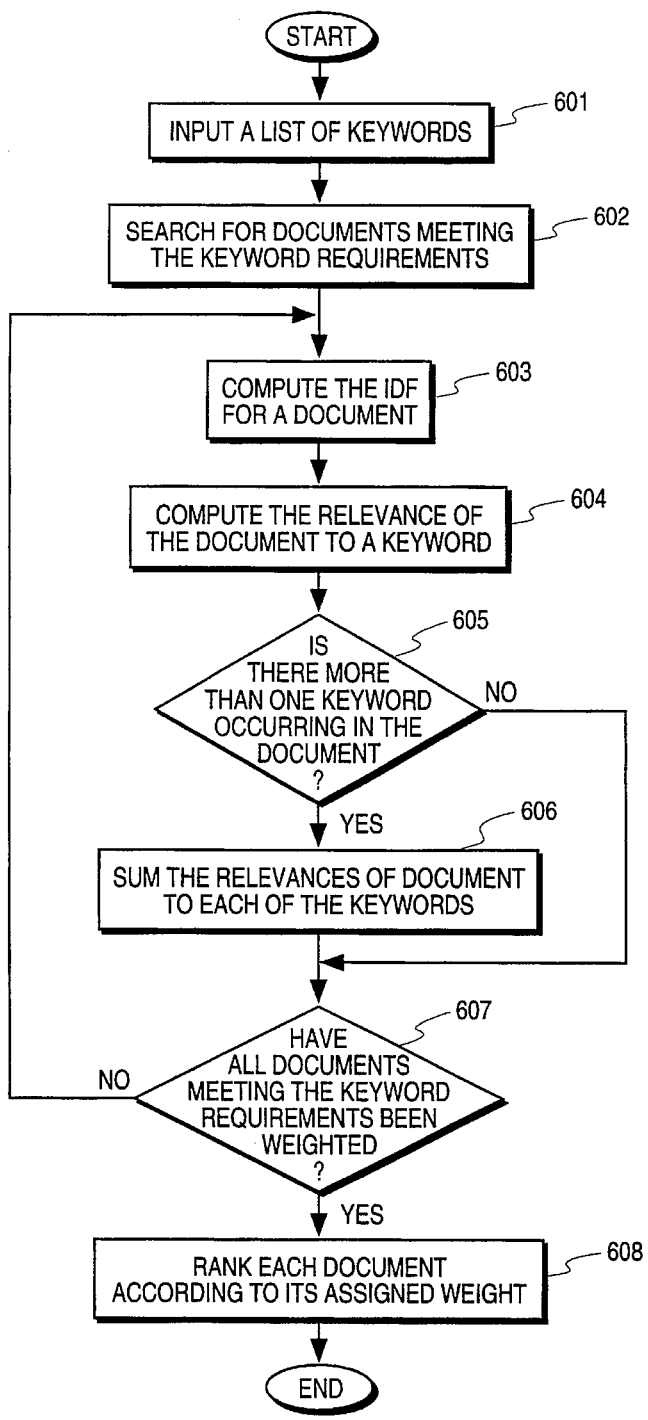
FIG. 6 is a flowchart illustrating the steps for determining and ranking the relevance of files in a database.

FIG. 6 is a flowchart illustrating the steps for determining and ranking the documents in the database. First, a list of keywords is input, step 601. Second, a search is conducted to locate those documents meeting the keyword requirements, step 602. The IDF is computed for that document, step 603, based on the following formula.

IDF=$\log_2$ (total number of documents in the database/number of documents containing the keyword)+1

Next, the relevance of the document to a keyword is determined in step 604, based on the following formula:

$$\text{Relevance} = \frac{\log_2 (\text{number of times keyword is used in the document}) * IDF}{\log_2 (\text{total number of words in the document})}$$

A determination is made as to whether the document contains more than one keyword, step 605. If so, the relevances attributed to each keyword is summed, step 606. Steps 603 through 606 are repeated for each document meeting the keyword requirements in order to determine their relevant weights, step 607. Finally, each related document is ranked according to its assigned relevancy weight, step 608.

Figure 7:
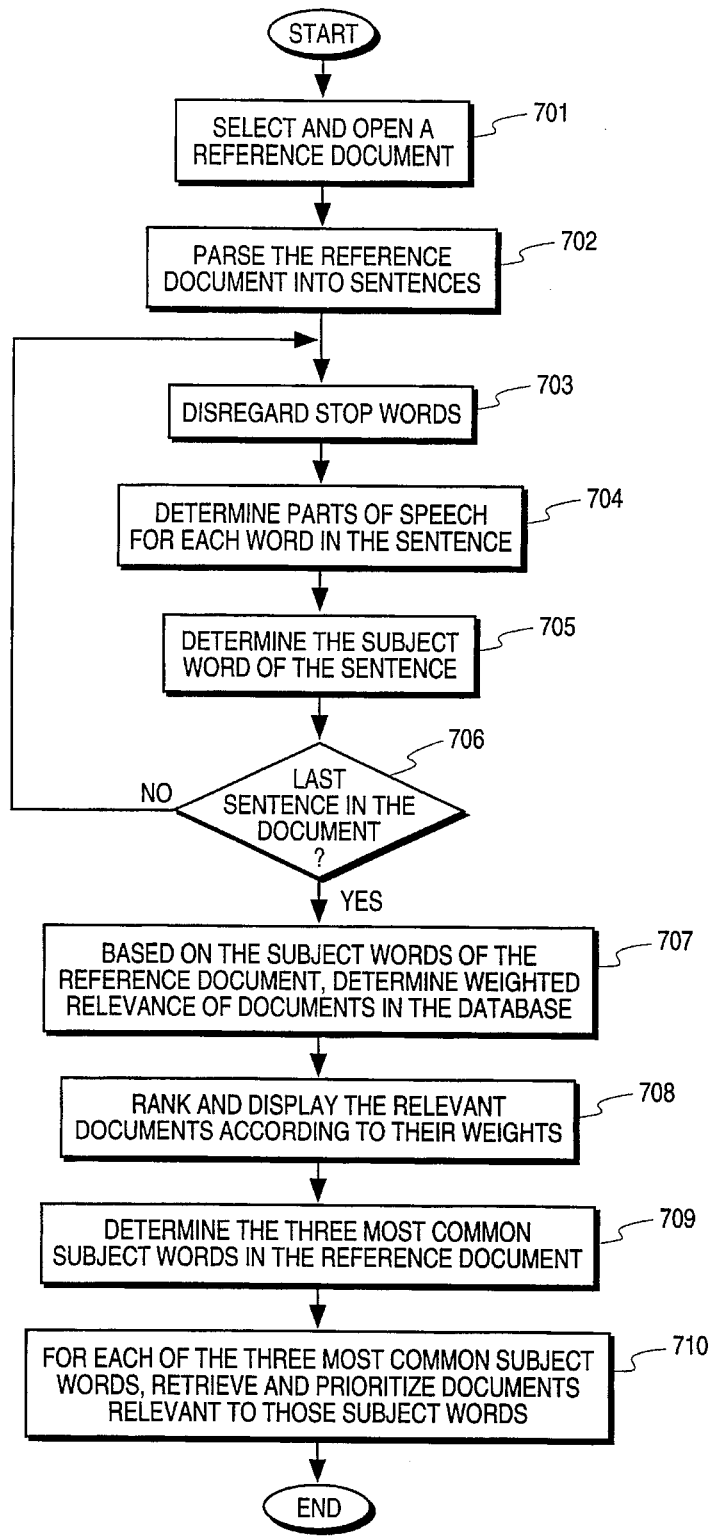
FIG. 7 is flowchart illustrating the steps involved in a document agent search.

In a Document Agent Search, a user specifies a reference document, and a search retrieves other similar and related documents from the database. FIG. 7 is a flowchart illustrating the basic steps involved in a Document Agent Search. First, a user selects and opens a reference document which is of interest, step 701. The reference document is parsed into sentences, step 702. This can be accomplished by determining periods followed by two spaces and a capital letter. Inconsequential stop words such as A, AN, THE, AND, OR, BUT, OF, etc., are disregarded, step 703. Each of the remaining words in the sentence is looked up in a stored dictionary to determine its parts of speech (e.g., noun, verb, adjective, adverb, preposition, etc.), step 704. A natural language processing algorithm, such as an Augmented Transition Network (ATN), can determine the subject word of the sentence. Based on each word's part of speech and based on a set of heuristic, syntactical grammar rules (e.g., the placement of the word in the sentence), the subject word of the sentence is determined, step 705. Steps 703–705 are repeated to extract the subjects of each sentence in the reference document, step 706.

Based on the subject words of the reference document, the weighted relevance of the documents in the database is determined (as described above in the flowchart of FIG. 6), step 707. Relevant documents are retrieved, ranked, and displayed according to their weighted relevance's, step 708. The three most common subject words in the reference document are determined, step 709. Documents which are relevant to each of the three most common subject words are retrieved, prioritized, and displayed in three rows, with each row corresponding to one of the common subject words, step 710.

In the currently preferred embodiment, only the subject words of the reference document is used as keywords in a search to find relevant documents in the database. In alternative embodiments, words in headings; direct and indirect objects; bold, italicized, and underlined words; etc., can be found and included as part of the search process. Furthermore, the frequencies of occurrences of subject words in the reference document can be included as a factor in the statistical relevance calculation. Another alternative embodiment of the present invention is to weight the words in each sentence in the reference document. For example, if a word is a subject, it might be weighted heavily. Other words in the sentence, such as direct objects might have a lesser weight. The weight of that word might increase if it is used elsewhere in that document as an indirect object. In addition, a word which is unique might be weighted more heavily.

A user can maximize the search results window 800 as illustrated in FIG. 8. Note the weighted list of retrieved documents 801 on the right-hand side, and the thumbnail images depicting the navigation chart 802 on the left-hand side.

Thus, an apparatus and method for searching and retrieving text in a database as a function of relevancy to a desired subject matter is disclosed.

What is claimed is:

1. A computer system for searching and retrieving files in a database comprising:

a bus;

an input device coupled to said bus for selecting a first reference file;

a storage area coupled to said bus having stored therein a program;

a processor coupled to said bus for executing said program, said program including an algorithm for determining significant words of text comprising said first file, and a comparison algorithm for comparing said significant words of said first reference file and text of a second file in said database; and a display device, coupled to said bus, for displaying a plurality of said significant words from said first reference file and one or more images corresponding to retrieved files, wherein said one or more images are grouped based upon the retrieved files' relevance to said plurality of said significant words, wherein selecting one of said images designates the corresponding retrieved file as a second reference file for initiating a second search and retrieval of files in said database which are relevant to said second reference file.

2. The apparatus of claim 1, wherein said program is further comprised of:

an algorithm for repeatedly performing statistical comparisons between said significant words of said first reference file and text of other files of said database and assigning a weight to each of said other files;

a ranking algorithm for ranking said other files according to said weights and displaying a list of said ranked files.

3. The apparatus of claim 2, wherein said significant words include subject words.

4. The apparatus of claim 2, wherein said significant words include direct objects.

5. The apparatus of claim 2, wherein said significant words include bold, underlined, and italicized words.

6. The apparatus of claim 2, wherein said significant words are weighted before performing said comparison.

7. The apparatus of claim 2 is further comprised of a search algorithm for searching, retrieving, and ranking files in said database based on keywords.

8. The apparatus of claim 1, wherein said algorithm for determining said significant words is comprised of:

a parsing algorithm for parsing text of said reference file into sentences;

a filtering algorithm for disregarding inconsequential words in a sentence;

a natural language processing algorithm for determining which of said words in said sentence are significant based on parts of speech for said significant words and a set of heuristic grammar rules.

9. The apparatus of claim 8, wherein said significant words include subject words.

10. The apparatus of claim 8, wherein said significant words include direct objects.

11. The apparatus of claim 8, wherein said significant words include bold, underlined, and italicized words.

12. The apparatus of claim 8, wherein said significant words are weighted before performing said comparison.

13. The apparatus of claim 8 is further comprised of a search algorithm for searching, retrieving, and ranking files in said database based on keywords.

14. The apparatus of claim 1, wherein said comparison is a function of a frequency of significant words in said second file, a function of a distribution of said significant words within said database, and is normalized by a function of a length of said second file.

15. The apparatus of claim 14, wherein said significant words include subject words.

16. The apparatus of claim 14, wherein said significant words include direct objects.

17. The apparatus of claim 14, wherein said significant words include bold, underlined, and italicized words.

18. The apparatus of claim 14, wherein said significant words are weighted before performing said comparison.

19. The apparatus of claim 14 is further comprised of a search algorithm for searching, retrieving, and ranking files in said database based on keywords.

20. An apparatus for searching, retrieving, and displaying files in a database comprising:

a computer system for selecting and opening a reference file;

a search algorithm executed by said computer system for searching for and retrieving files from said database which are related to said reference file based on comparing significant words of said reference file and text of other files residing in said database;

an algorithm for categorizing and prioritizing said retrieved files into a plurality of groups, wherein each of said plurality of groups corresponds to a commonly used subject word in said reference file; and a display for displaying said commonly used subject words, bit-mapped images representing said prioritized files corresponding to commonly used words, and a bit-mapped image representing said reference file, said bit-mapped images being scaled representations of document cover sheets in said files, wherein selecting a bit-mapped image results in designating its corresponding file as the reference file and initiates a search and retrieval based on said designated reference file.

21. The apparatus of claim 20 wherein said searching and retrieving means is comprised of:

a means for performing a statistical comparison between said significant words of said reference file and files residing in said database;

a means for retrieving files from said database based on said statistical comparison.

22. A method for searching and retrieving files in a database comprising the steps of:

(a) selecting a first reference file;

(b) determining significant words of text comprising said first reference file:

(c) comparing said significant words of said first reference file and text of a second file in said database;

(d) determining whether to retrieve said second file based on said step of comparing;

(e) retrieving said second file if said step of determining indicates said second file should be retrieved;

(f) displaying a plurality of said significant words;

(g) displaying one or more images corresponding to retrieved files, wherein said one or more images are grouped based upon the retrieved files' relevance to said plurality of said significant words; and (h) upon selection of one of said images, designating the corresponding retrieved file as a second reference file and initiating a second search and retrieval of files in said database relevant to said second reference file.

23. The method of claim 22, further comprising the steps of:

repeatedly performing comparisons between said significant words of said first reference file and other files of said database;

assigning a weight to each of said other files based on said comparison;

ranking said other files according to said weights;

displaying a list of ranked files.

24. The method of claim 23, wherein said determining step is comprised of the steps of:

parsing text of said first reference file into sentences;

disregarding inconsequential words in said sentences;

determining which of said words in said sentences are significant based on parts of speech for said significant words and heuristic grammar rules.

25. (Amended) The method of claim 24, wherein said comparison is a statistical comparison as a function of frequency of significant words in said second file and a distribution of said significant words within said database and is normalized by a function of a length of said second file.

26. The method of claim 25, wherein said significant words include subject words.

27. The method of claim 25, wherein said significant words include direct objects.

28. The method of claim 25, wherein said significant words include bold, underlined, and italicized words.

29. The method of claim 25, further comprising the step of weighting said significant words before performing said statistical comparison.

30. The method of claim 25, further comprising the steps of searching, retrieving, and ranking files in said database according to keywords.

* * * * *